United States Patent [19]

Schwartz

[11] 4,182,702

[45] Jan. 8, 1980

[54] NOVEL PROCESSING AIDS FOR NATURAL AND SYNTHETIC RUBBER COMPOUNDS

[75] Inventor: Nelson N. Schwartz, Paterson, N.J.

[73] Assignee: Technical Processing, Inc., Paterson, N.J.

[21] Appl. No.: 920,951

[22] Filed: Jun. 30, 1978

[51] Int. Cl.² ............................................. C08K 9/04
[52] U.S. Cl. ............................. 260/42.16; 260/42.37
[58] Field of Search ............... 260/42.16, 42.31, 42.37; 106/309

[56] References Cited

U.S. PATENT DOCUMENTS

| | | | |
|---|---|---|---|
| 2,692,870 | 10/1954 | Pechukas | 260/42.16 X |
| 3,022,299 | 2/1962 | Schmidt et al. | 106/309 X |
| 3,224,998 | 12/1965 | Kirkconnell | 260/42.16 X |
| 3,628,738 | 12/1971 | Mitchell et al. | 106/309 X |
| 3,997,503 | 12/1976 | Henman et al. | 260/42.16 X |

*Primary Examiner*—Sandra M. Person
*Attorney, Agent, or Firm*—Kenyon & Kenyon

[57] ABSTRACT

This invention is concerned with a novel rubber processing aid, as well as with the use of that aid for improving the processing of rubber. More specifically, the present invention is concerned with the formation of an amine salt of an aralkylsulfonic acid through the deposition of an amine and an aralkylsulfonic acid on a natural or synthetic clay base. This invention is further concerned with the use of said aralkylsulfonic salt composition, optionally modified with additives such as a thioether or a long chain fatty acid, for improving the processing of natural and synthetic rubber.

13 Claims, No Drawings

NOVEL PROCESSING AIDS FOR NATURAL AND SYNTHETIC RUBBER COMPOUNDS

CROSS-REFERENCES TO RELATED APPLICATIONS

This application is related to the subject matter of my copending application Ser. No. 920,952 entitled "Novel Processing Aids for Natural and Synthetic Rubber Compounds" filed June 30, 1978, application Ser. No. 888,605 filed Mar. 20, 1978, U.S. Pat. No. 4,010,129, granted Mar. 1, 1977, and U.S. Pat. No. 3,882,062, granted May 6, 1975.

BACKGROUND OF THE INVENTION

It is well known that natural and synthetic rubbers usually must be mixed or "compounded" with vulcanizing agents, plasticizers, extenders, fillers, pigments, and the like, so that the rubber can be cured or vulcanized in a mold to form useful articles. It has frequently been found necessary to incorporate certain "processing aids" in the rubber compound prior to molding and curing to improve the mixing of the ingredients of the rubber compound, the flowability of the rubber during processing, and the extruding characteristics of the rubber product, without seriously adversely affecting the physical properties of the rubber compound. In addition, such aids are employed to reduce the mixing time requisite to effect rubber compounding, to enable the use of lower mixing temperatures and to provide for better additive dispersal than do traditional methods.

In accordance with U.S. Pat. No. 3,787,341, issued Jan. 22, 1974, it was found that useful processing aids include homogenous mixtures of 1. alkali metal or amine salts of aromatic sulfonic acids of the general formula:

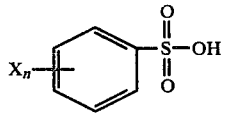

wherein X can be either hydrogen or a branched or straight chain alkyl group having from 4 to 14 carbon atoms, and preferably 8 to 12 carbon atoms; and n has a value of 1 to 5, and preferably 1; and 2. long chain fatty acids having a maximum of about 22 carbon atoms in the chain, such as, but not limited to, stearic acid, palmitic acid, oleic acid, neodecanoic acid and mixtures of such acids, present in amounts at least about equal to the amount of sulfonate present.

As is disclosed in U.S. Pat. No. 3,882,062, issued May 6, 1975, it was subsequently found that thioethers catalyze the peptizing action of the above composition in achieving a reduction in the viscosity of the rubber compound. This catalysis provides for a reduction in the amount of energy required to effect compounding and allows the mixing of the rubber compound to occur at lower temperatures, thereby reducing the possibility of scorching.

It was then found in accordance with U.S. Pat. No. 4,010,129, issued Mar. 1, 1977, and copending application Ser. No. 920,952 filed June 30, 1978, that thioethers not only catalyze the action of the above specified fatty acid/aromatic sulfonate composition, but also provide for the reduction and even the elimination of the fatty acid ingredient without detrimentally affecting either the physical properties or the processing of the rubber compound. Through the realization of this invention, a substantial savings in the cost of the processing aid is achieved.

A preferred class of thioethers disclosed in U.S. Pat. No. 4,010,129, issued Mar. 1, 1977, consists of the thiodicarboxylic acids and their corresponding lower alkyl ethers of the formula:

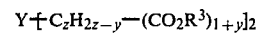

wherein Y is as defined above; z is a number whose value falls in the range of 1 to about 2; y is a number whose value ranges from 0 to about 1; and $R^3$ is hydrogen or a lower alkyl containing a maximum of 3 carbon atoms. Suitable thioethers of this class include thiodiglycolic acid, thiodipropionic acid, methylene bis(thioacetic acid), dimethyl thiodipropionate, thiodisuccinic acid, thiodipropionitrile and dibenzyl sulfate.

Copending application Ser. No. 920,952 entitled "Novel Processing Aids for Natural and Synthetic Rubber Compounds" filed June 30, 1978, discloses that especially desirable thioethers for use in this regard are thioethanols of the general formula:

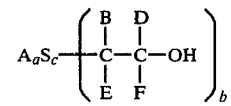

wherein a is a number whose value is either 0 or 1 and b is a number whose value is either 1 or 2, such that the sum of a and b equals 2; c is a number whose value is either 1 or 2; A represents a hydrocarbon radical with 1 to 18 carbon atoms; and B, D, E and F represent either hydrogen or hydrocarbon radicals with 1 to 18 carbon atoms, all of the above with the proviso that the total number of carbon atoms in the thioether does not exceed 21.

Hydrocarbon radicals preferably comprise saturated or aromatically unsaturated moieties, and include alkyl, aryl, alkaryl and aralkyl radicals. The radicals represented by B, D, E and F are preferably hydrogen or lower alkyl of from about 1 to about 3 carbon atoms. Typical thioethanols which were disclosed include 2-(methylthio)ethanol, 2-(ethylthio)ethanol, 2-(2'-ethylhexylthio)ethanol, 2-(phenylthio)ethanol, 2-(dodecylphenylthio)ethanol, 2-(benzylthio)ethanol, 2-(ethylthio)-1-methylethanol and the like. Preferred thioethanols are those wherein b is 2, with thiodiethanol being especially preferred.

Certain problems arise in the formation of the amine salts of aralkylsulfonic acids to be used as rubber processing aids in accordance with the foregoing patents and patent application. The formation of the aralkylsulfonate salt requires mixing of the sulfonic acid with an amine, and the corrosive nature of the acid often results in substantial damage to the mixing equipment during this process. In connection with the use of the aralkylsulfonate salt composition, ease of handling and measurement of precise amounts is hindered by the usual physical states of the compositions, e.g., as waxy or hard solids.

It has been found in accordance with my copending application Ser. No. 888,605, filed Mar. 20, 1978, that rubber processing aids composed of petrolatum and natural or synthetic clays in the form of particulate, relatively free-flowing powders are easier to handle and more efficient to use than traditional forms of such processing aids. In addition, the use of a clay substrate provides a medium for combining any immiscible liquids used in the processing aid.

THE INVENTION

It is an object of this invention to provide an improved rubber processing aid.

Another object of this invention is to provide an improved aralkylsulfonate salt-based rubber processing aid.

A further object of this invention is to provide an aralkylsulfonate salt processing aid which is in the form of a particulate powder.

Still another object of this invention is to minimize the corrosion and the caking associated with the formation of the aralkylsulfonate salt used in the rubber processing aid.

Yet another object of this invention is to provide a method for combining any immiscible liquids used in the rubber processing aid.

In accordance with this invention it has now been found that these and other objects of this invention which will be apparent from the ensuing specification and examples, are achieved through the use of compositions containing:

(1) natural or synthetic clay upon which is deposited
(2) an amine of the general formula:

$$R^4R^5R^6N$$

wherein $R^4$ is alkyl or hydroxyalkyl, of from 1 to about 20 carbon atoms; each of $R^5$ and $R^6$ is hydrogen, alkyl or hydroxyalkyl of from 1 to about 20 carbon atoms; and $R^4$ and $R^5$, when taken together, form a divalent alkylene or alkylenoxyalkylene radical containing up to about 7 carbon atoms, which when combined with $=NR^6$, forms a cyclic amine having from 5 to 7 ring members; and (3) an aralkylsulfonic acid of the general formula:

$$R_x-R^7-(SO_3H)_m$$

wherein R is an alkyl group of from 1 to 18 carbon atoms; $R^7$ is an arylene group of from 6 to 14 carbon atoms; and each of x and m has a value of from 1 to 4 such that the sum of x and m has a value of from 2 to 5.

The clays which can be employed in accordance with this invention may be either natural or synthetic. As is well known, clay minerals are hydrous silicates of aluminum, iron or magnesium, and may contain other mineral particles. Typical natural clays which may be employed in accordance with this invention are the kaolinite, the montmorillonite, the illite, the chlorite and the attapulgite clays, including china clay, kaoline, ball clay, fire clay, flint clay, diospore clay, mullute, bentonite, and the like. Synthetic silica and silicate clay materials, as well as diatomaceous earth may also be employed. For example, synthetic molecular sieves, such as 13 A molecular sieves, may be employed if desired. As used herein, the term "clay" embraces both the natural and synthetic clays.

Preferred amines for use in this invention are those having up to about 39 carbon atoms, a molecular weight of at least 149, are themselves liquid, and which react with aralkyl-sulfonic acid to form a salt. Especially preferred amines are the tertiary amines such as triethanolamine and tri(tridecyl)amine.

Preferred aralkylsulfonic acids for use in accordance with this invention are those of the general formula:

$$R_x-R^7-(SO_3H)_m$$

wherein R, x and m are as previously defined and $R^7$ is a phenylene group. Especially preferred aralkylsulfonic acids are dodecylbenzenesulfonic acid and tridecylbenzenesulfonic acid.

A number of optional ingredients may be incorporated in the compounds of this invention to provide additional rubber processing aids. Such materials include a long chain fatty acid containing not more than 22 carbon atoms in the chain and a thioether, preferably a thioethanol of the general formula specified hereinabove.

In addition a composition of this invention may be mixed with a variety of other additives to facilitate its introduction into the rubber. Such additional materials generally comprise aromatic esters, compounds with alcoholic and glycolic groups, and a paraffin. Specifically, these compounds comprise:

(a) From about 5 to 15 weight percent of aromatic esters selected from the groups consisting of: (1) diaryl- and diarylalkyl phthalates; (2) diaryl- and arylalkyl monoglycolether phthalates; (3) phthalates from polyglycol monoethers of aryl, aralkyl and alkaryl compounds wherein the polyglycol chain contains from about 2 to 6 ethylene oxide groups in the chain; (4) dibenzoates of glycol and propyleneglycol, and their di- and trimers; and (5) mixtures of the above.

(b) Up to about 15 weight percent of compounds with alcoholic or glycolic hydroxy groups selected from (1) linear primary alcohols of 12 to 30 carbons such as cetyl alcohol and the like; (2) alkylphenoxypolyethylene glycols wherein the alkyl group contains 6 to 15 carbons and having from about 2 to about 20 ethyleneoxy units such as nonylphenoxytetraethylene glycol and the like; and (3) telomers of epoxides of 2 to 4 carbon atoms such as the polyethylene glycols and polypropylene glycols having from about 2 to about 10 alkylene oxide units, such as tetraethylene glycol and tripropylene glycol and the like.

(c) Up to about 60 weight percent of hydrocarbons selected from the group consisting of mineral oil, mineral waxes, and petrolatum; and mixtures of the above.

However, compositions of this invention are not limited to use in combination with the above additional materials and any similar chemicals will suffice. All ingredients may be of technical grade and may contain varying amounts of related materials, by-products, etc.

Preferred formulations for processing aids of this invention contain the following appropriate percentages by weight of components typical of their respective classes:

| Percent By Wt. | Component |
| --- | --- |
| 20 to 80% | natural or synthetic clay |
| 3 to 40% | amine |
| 5 to 55% | aralkylsulfonic acid |
| 0 to 30% | thioether |
| 0 to 10% | nonylphenoxytetraethylene glycol |
| 0 to 10% | tripropylene glycol |
| 0 to 15% | linear primary alcohols and/or hydrocarbons |

The compounds of this invention are preferably made by first charging the clay to the mixing vessel, and then, while stirring, adding the liquid amine followed by the aralkylsulfonic acid. Although introduction of the sulfonic acid may precede that of the amine, corrosion problems arising from the interaction of the acid with the mixing apparatus are minimized when the former procedure is employed.

pounding of natural and synthetic rubber, including styrene-butadiene rubber, ethylene-propylene rubber, butadiene rubber, butadiene-acrylonitrile rubber, chloroprene and the like. The rubber may be virgin or reclaimed rubber.

The following Examples are illustrative of the present invention. The processing aids employed in Examples 1 and 2 are as follows:

| Component, Pts. By Wt. | COMPOUND | | | | | | | | | | | |
|---|---|---|---|---|---|---|---|---|---|---|---|---|
| | A | B | C | D | E | F | G | H | I | J | K | L |
| CLAY | 560 | 530 | 490 | 530 | 490 | 500 | 500 | 510 | 530 | 430 | 480 | 480 |
| TRIETHANOLAMINE | 140 | 140 | 140 | 140 | 140 | 109 | 103 | 140 | 140 | 140 | 140 | 140 |
| DODECYLBENZENE-SULFONIC ACID | 300 | 300 | 300 | 300 | 300 | 234 | 221 | 300 | 300 | 300 | 300 | 300 |
| THIODIPROPIONIC ACID | 30 | 30 | — | — | — | — | — | — | — | — | — | — |
| THIODIPROPIONITRILE | — | — | — | — | — | — | — | — | 30 | — | — | 30 |
| THIODIETHANOL | — | — | — | 30 | 30 | 24 | 22 | — | — | 30 | 30 | — |
| NONYLPHENOXYTETRA-ETHYLENE GLYCOL | — | — | 40 | — | 40 | — | 29 | 50 | — | 50 | 50 | 50 |
| TRIPROPYLENE GLYCOL | — | — | — | — | — | — | — | — | — | 50 | — | — |
| CETYL ALCOHOL | — | — | — | — | — | 133 | 125 | — | — | — | — | — |

The proportions of amine and aralkylsulfonic acid are preferably equinormal, i.e., sufficient to achieve stoichiometric neutralization. However, up to about a 10 percent molar excess of either amine or acid can be employed. The neutralization reaction is exothermic and it is thus preferable, but not essential, to incorporate any optional ingredients following this neutralization so that the evolved heat can assist in maintaining the additives in a liquid state until they are thoroughly admixed. Incorporation of the optional constituents at this stage also inhibits any decomposition of these materials which might be occasioned by contact with the free aralkylsulfonic acid.

The processing aid is employed in an amount sufficient to impart improved processing characteristics to the rubber during compounding. In general, such amounts are from about 0.5 to about 3.0 weight percent, and preferably about 1.5 to about 2.5 weight percent, based upon the weight of the rubber. As a result, the clay is present in the compound at levels of only about 0.3 to about 2.0 weight percent, and preferably from about 0.5 to about 1.8 weight percent, based upon the weight of the rubber.

Clays, of course, have been employed as fillers for rubber. However, when used as a filler, clay ordinarily is employed in amounts from about 10 to about 200 parts per 100 parts of rubber. The additive of this invention is employed in such small amounts that the clay does not have any significant effect as a filler.

The processing aids of this invention are added to the rubber at the beginning of the mixing cycle, along with the usual pigment fillers, vulcanizing agents, plasticizers, softeners and the like, allowing the entire compounding to be performed in one operation. The compositions of this invention can be employed in the com- The above compounds can be prepared in any suitable device, e.g., ribbon blender, planetary mixer, etc. The ingredients are mixed according to the procedure outlined hereinabove.

EXAMPLE 1

Each of Compounds A–L was evaluated in a natural rubber tread stock prepared according to the following recipe:

| Component | Pts. by Wt. |
|---|---|
| #4 Ribbed smoked sheet | 100 |
| MT Black[1] | 75 |
| Reogen[2] | 1 |
| Stearic Acid | 3 |
| Zinc Oxide | 5 |
| Sundex-790[3] | 10 |
| Agerite Superflex[4] | 2 |
| Antozite 67S[5] | 4 |
| Amax[6] | 0.75 |
| Sulfur | 3 |
| Total | 202.75 |

[1]Medium Thermal carbon black
[2]A peptizer supplied by R.T. Vanderbilt Co., Inc.
[3]An aromatic oil supplied by Sun Oil Company.
[4]An antioxidant supplied by R.T. Vanderbilt Co., Inc.
[5]An antiozonant supplied by R.T. Vanderbilt Co., Inc.
[6]An accelerator supplied by R.T. Vanderbilt Co., Inc.

The above stock was mixed without the additives of this invention or with 2.10 parts by weight of one of the compounds of this invention. Processing was performed in a Banbury mixer at 40 rmp (30 rpm for compounds A–G), and both the processing characteristics and the physical properties of the cured stock were evaluated. The results of these tests are summarized in TABLE I below.

TABLE I

| Evaluation of Compounds A-L in Natural Rubber | | | | | | | | | | | | | |
|---|---|---|---|---|---|---|---|---|---|---|---|---|---|
| | RUBBER COMPOUND | | | | | | | | | | | | |
| | CONTROL | R | B | C | D | E | F | G | H | I | J | K | L |
| MIX TIME (MIN) | 10 | 8 | 8 | 9 | 10 | 9 | 10 | 9 | 8 | 7 | 9 | 8 | 9 |
| DUMP TEMP. (°F.) | 310 | 245 | 245 | 255 | 235 | 235 | 240 | 245 | 240 | 235 | 235 | 230 | 235 |
| SCORCH (MIN) | 8 | 10 | 9 | 9 | 10 | 10 | 9 | 9 | 10 | 10 | 10 | 10 | 9 |
| TENSILE STRENGTH (PSI) | 3000 | 2950 | 2940 | 2940 | 2900 | 2925 | 2940 | 2930 | 2960 | 2955 | 2960 | 2950 | 2930 |

TABLE I-continued

| Evaluation of Compounds A-L in Natural Rubber | | | | | | | | | | | | | |
|---|---|---|---|---|---|---|---|---|---|---|---|---|---|
| | RUBBER COMPOUND | | | | | | | | | | | | |
| | CONTROL | R | B | C | D | E | F | G | H | I | J | K | L |
| 100% MODULUS (PSI) | 560 | 540 | 540 | 540 | 530 | 530 | 535 | 540 | 550 | 550 | 560 | 550 | 535 |
| ELONGATION (%) | 490 | 485 | 475 | 480 | 475 | 480 | 470 | 465 | 480 | 475 | 480 | 480 | 470 |
| HARDNESS (SHORE A) | 91 | 87 | 86 | 86 | 86 | 85 | 85 | 84 | 90 | 90 | 89 | 89 | 89 |
| MOONEY VISCOSITY | 48 | 41 | 38 | 38 | 37 | 36 | 35 | 35 | 40 | 42 | 40 | 39 | 38 |

All the stocks containing the products of this invention could be mixed in a single pass, but the control required 2 passes through the Banbury.

EXAMPLE 2

Each of the Compounds H-L was also evaluated in the synthetic rubber compound chloroprene having the following composition:

| Component | Pts. by Wt. |
|---|---|
| Neoprene GRT[1] | 100 |
| MT Black[2] | 90 |
| Stearic Acid | 1 |
| Dibutoxyethyl Phthalate | 7 |
| Phenyl-1-Naphthylamine | 1.5 |
| Neophax[3] | 10.6 |
| Magnesium Oxide | 3.6 |
| SR-111 Oil[4] | 2.5 |
| Zinc Oxide | 5.5 |
| Total | 221.7 |

[1] A chloroprene polymer sold by E.I. du Pont de Nemours, Inc.
[2] Medium Thermal (MT) carbon black.
[3] A vulcanized vegetable oil sold by American Cyanamid Co., Inc.
[4] A naphthenic oil sold by C.P. Hall, Inc.

The above stock was mixed without the additives of this invention or with 2.25 parts by weight of one of Compounds H-L of this invention. Processing was performed in a Banbury mixer at 40 rpm, and both the processing characteristics and the physical properties of the cured stock were evaluated. The results of these tests are shown in TABLE II below.

TABLE II

| Evaluation of Compounds H-L in a Synthetic Rubber | | | | | | |
|---|---|---|---|---|---|---|
| | RUBBER COMPOUND | | | | | |
| | CONTROL | H | I | J | K | L |
| MIX TIME (MIN) | 8 | 7 | 8 | 8 | 8 | 8 |
| DUMP TEMP. (°F.) | 290 | 240 | 235 | 240 | 225 | 225 |
| SCORCH at 320° F. (MIN) | 10 | 10 | 10 | 9 | 10 | 10 |
| 100% CURE at 320° F. (MIN) | 15 | 15 | 15 | 12 | 15 | 15 |
| TENSILE STRENGTH (PSI) | 2200 | 2200 | 2200 | 2200 | 2230 | 2200 |
| 100% MODULUS (PSI) | 315 | 315 | 315 | 315 | 320 | 315 |
| ELONGATION (%) | 305 | 310 | 310 | 305 | 320 | 310 |
| HARDNESS (SHORE A) | 90 | 90 | 90 | 88 | 89 | 89 |
| VISCOSITY (ML4 at 212° F.) | 53 | 50 | 50 | 48 | 43 | 42 |

| Component, Pts. By Wt. | COMPOUND | | | | |
|---|---|---|---|---|---|
| | M | N | O | P | Q |
| Kaolin | 718 | — | — | — | — |
| Synthetic Calcium Silicate | — | 280 | — | — | — |
| Attapulgite | — | — | 500 | — | — |
| Diatomaceous Earth | — | — | — | 564 | — |
| Bentonite | — | — | — | — | 637 |
| Triethanolamine | 90 | 229 | 159 | 139 | 51 |
| Dodecylbenzenesulfonic Acid | 192 | 491 | 341 | 297 | 108 |

These products were evaluated in natural rubber according to the recipe and the procedure specified in Example 1. The processing characteristics and the physical properties of each cured stock were evaluated. The results of these tests are shown in TABLE III below.

TABLE III

| Evaluation of Compounds M-Q in Natural Rubber | | | | | | |
|---|---|---|---|---|---|---|
| | RUBBER COMPOUND | | | | | |
| | M | N | O | P | Q | Control |
| Mix Time | 7 | 7 | 8 | 8 | 7 | 10 |
| Dump Temp (°F.) | 235 | 240 | 250 | 245 | 245 | 300 |
| Scorch (min) | 10 | 10 | 10 | 01 | 01 | 9 |
| Tensile Strength (psi) | 3000 | 3000 | 2985 | 3000 | 3000 | 2990 |
| 100% Modulus (psi) | 510 | 520 | 515 | 540 | 515 | 520 |
| Elongation (%) | 460 | 445 | 430 | 450 | 425 | 450 |
| Hardness (Shore A) | 90 | 90 | 85 | 86 | 88 | 91 |
| Mooney Viscosity | 43 | 44 | 50 | 48 | 45 | 52 |

EXAMPLE 3

Different types of clay may be employed in the preparation of the compounds of this invention. Accordingly, the following Compounds M-Q were prepared in accordance with the technique specified hereinabove.

EXAMPLE 4

A variety of both amines and aralkylsulfonic acids can be used in accordance with this invention. Accordingly, the following Compounds 1-10 were formulated using the technique disclosed hereinabove.

| Component, Pts. By Wt. | COMPOUND 1 | 2 | 3 | 4 | 5 | 6 | 7 | 8 | 9 | 10 |
|---|---|---|---|---|---|---|---|---|---|---|
| Clay | 500 | 500 | 500 | 500 | 500 | 500 | 500 | 500 | 500 | 500 |
| Tri(tridecyl)amine | 311 | — | — | — | — | — | — | — | — | — |
| Dimethyloctadecylamine | — | 237 | — | — | — | — | — | — | — | — |
| Triethanolamine | — | — | 157 | — | — | — | — | — | — | 152 |
| N-Ethylmorpholine | — | — | — | 130 | — | — | — | — | — | — |
| Morpholine | — | — | — | — | 105 | — | — | — | — | — |
| Isopropylamine | — | — | — | — | — | 77 | — | — | — | — |
| 2-Amino-2-methyl-1-propanol | — | — | — | — | — | — | 107 | — | — | — |
| Tetraethylene pentamine | — | — | — | — | — | — | — | 47 | — | — |
| Diethanolamine | — | — | — | — | — | — | — | — | 122 | — |
| Dodecylbenzenesulfonic acid | 189 | 263 | 343 | 370 | 395 | 423 | 393 | 453 | 378 | — |
| Tridecylbenzenesulfonic acid | — | — | — | — | — | — | — | — | — | 348 |

These compounds were evaluted in natural rubber according to the recipe and the procedure outlined in Example 1. The products were assessed for their processing characteristics and their physical properties. The results of these tests are shown in TABLE IV below.

TABLE IV

Evaluation of Compounds 1–10 in Natural Rubber

| | RUBBER COMPOUND CONTROL | 1 | 2 | 3 | 4 | 5 | 6 | 7 | 8 | 9 | 10 |
|---|---|---|---|---|---|---|---|---|---|---|---|
| Mix Time (min) | 11 | 10 | 9 | 8 | 10 | 8 | 9 | 7 | 8 | 9 | 8 |
| Dump Temp. (°F.) | 295 | 260 | 240 | 245 | 250 | 240 | 245 | 240 | 235 | 245 | 240 |
| Scorch (min) | 9 | 8 | 7 | 8 | 9 | 9 | 10 | 11 | 10 | 10 | 9 |
| Tensile strength (psi) | 2850 | 2830 | 2840 | 2860 | 2870 | 2910 | 2990 | 2980 | 3000 | 2920 | 3000 |
| 100% Modulus (psi) | 490 | 470 | 475 | 490 | 490 | 515 | 570 | 570 | 580 | 515 | 550 |
| Elongation (%) | 450 | 420 | 425 | 460 | 460 | 465 | 475 | 480 | 480 | 460 | 460 |
| Hardness (Shore A) | 89 | 88 | 87 | 86 | 85 | 85 | 87 | 89 | 88 | 86 | 85 |
| Mooney Viscosity | 50 | 51 | 48 | 47 | 46 | 44 | 43 | 43 | 42 | 44 | 40 |

From the data presented in TABLES I–IV, it is evident that the processing characteristics of the rubber compounds are improved through the use of the products of this invention, while the final physical properties of the rubber remain essentially unchanged.

What is claimed is:

1. An improved rubber processing aid comprising:
   (a) natural or synthetic clay upon which is deposited
   (b) an amine of the general formula:

$R^4R^5R^6N$ wherein $R^4$ is alkyl or hydroxyalkyl, of from 1 to about 20 carbon atoms; each of $R^5$ and $R^6$ is hydrogen, alkyl or hydroxyalkyl of from 1 to about 20 carbon atoms; and $R^4$ and $R^5$, when taken together, form a divalent alkylene or alkylenoxyalkylene radical containing up to about 7 carbon atoms, which when combined with $=NR^6$, forms a cyclic amine having from 5 to 7 ring members; and
   (c) an aralkylsulfonic acid of the general formula:

$R_x-R^7-(SO_3H)_m$ wherein R is an alkyl group of from 1 to 18 carbon atoms; $R^7$ is an arylene group of from 6 to 14 carbon atoms; and each of x and m has a value of from 1 to 4 such that the sum of x and m has a value of from 2 to 5.

2. A composition according to claim 1 wherein $R^7$ is a phenylene group.

3. A composition according to claim 2 wherein said aralkylsulfonic acid is dodecylbenzenesulfonic acid, and said amine is triethanolamine.

4. A composition according to claim 1 in which are added additional materials including a thioether; a fatty acid; an aromatic ester; a compound with alcoholic or glycolic hydroxy groups; and a paraffin.

5. A composition according to claim 4 wherein said thioether is a thioethanol of the general formula:

$$A_aS_c\left[\begin{matrix} B & D \\ | & | \\ -C-C-OH \\ | & | \\ E & F \end{matrix}\right]_b$$

wherein a is a number whose value is either 0 or 1 and b is a number whose value is either 1 or 2, such that the sum of a and b equals 2; c is a number whose value is either 1 or 2; A represents a hydrocarbon radical of 1 to 18 carbon atoms; and B, D, E and F represent either hydrogen or hydrocarbon radicals of 1 to 18 carbon atoms, all of the above with the proviso that the total number of carbon atoms does not exceed 21.

6. A composition according to claim 4 comprising from about 20 to about 80 weight percent natural or synthetic clay, about 3 to about 40 weight percent amine, about 5 to about 55 weight percent aralkysulfonic acid, 0 to about 30 weight percent thioether, 0 to about 10 weight percent nonylphenoxytetraethylene glycol, 0 to about 10 weight percent tripropylene glycol, and 0 to about 15 weight percent of linear primary alcohols, hydrocarbons or a combination thereof.

7. A composition according to claim 6 wherein said amine is triethanolamine and said aralkylsulfonic acid is dodecylbenzenesulfonic acid.

8. A process of preparing an improved rubber processing aid of a composition according to claims 1 or 4 wherein the clay constituent is charged to the mixing vessel preceding introduction of the amine and the aralkylsulfonic acid.

9. A process according to claim 8 wherein introduction of the amine constituent precedes that of the aralkylsulfonic acid ingredient.

10. An improved rubber composition comprising a rubber base and rubber additives wherein the improvement comprises a small but effective amount of a composition according to claim 1.

11. An improved rubber composition comprising a rubber base and rubber additives wherein the improvement comprises a small but effective amount of a composition prepared in accordance with claim 8.

12. An improved method for compounding rubber comprising admixing rubber with an additive of the class consisting of pigments, fillers and vulcanizing agents, wherein the improvement comprises admixing a composition according to claim 1 with rubber at the beginning of the mixing cycle prior to mastication of the rubber and no later than the time when said rubber is admixed with said additive.

13. An improved method for compounding rubber comprising admixing rubber with an additive of the class consisting of pigments, fillers and vulcanizing agents, wherein the improvement comprises admixing a composition prepared according to claim 8 with rubber at the beginning of the mixing cycle prior to mastication of the rubber and no later than the time when said rubber is admixed with said additive.

* * * * *

UNITED STATES PATENT AND TRADEMARK OFFICE
CERTIFICATE OF CORRECTION

PATENT NO. : 4,182,702
DATED : January 8, 1980
INVENTOR(S) : Nelson N. Schwartz

It is certified that error appears in the above–identified patent and that said Letters Patent are hereby corrected as shown below:

Col. 6, 1st Table, under "Thiodipropionic Acid, Column L"

insert a dash.

Col. 6, line 45, the line should be above TOTAL and not below it.

Col. 6, line 56, change "stock" to --stocks--.

Col. 7, TABLE I continued, change "R" to --A--.

Col. 7, line 30, the line should be above TOTAL and not below it.

Col. 8, lines 35-41 (TABLE III) under "Scorch (min) Columns

P and Q", change both occurrences of "01" to --10--.

Col. 11, lines 12-13, correct spelling of "aralkylsulfonic".

Signed and Sealed this

Twenty-eighth Day of July 1981

[SEAL]

Attest:

GERALD J. MOSSINGHOFF

*Attesting Officer*  *Commissioner of Patents and Trademarks*